Figure 1:
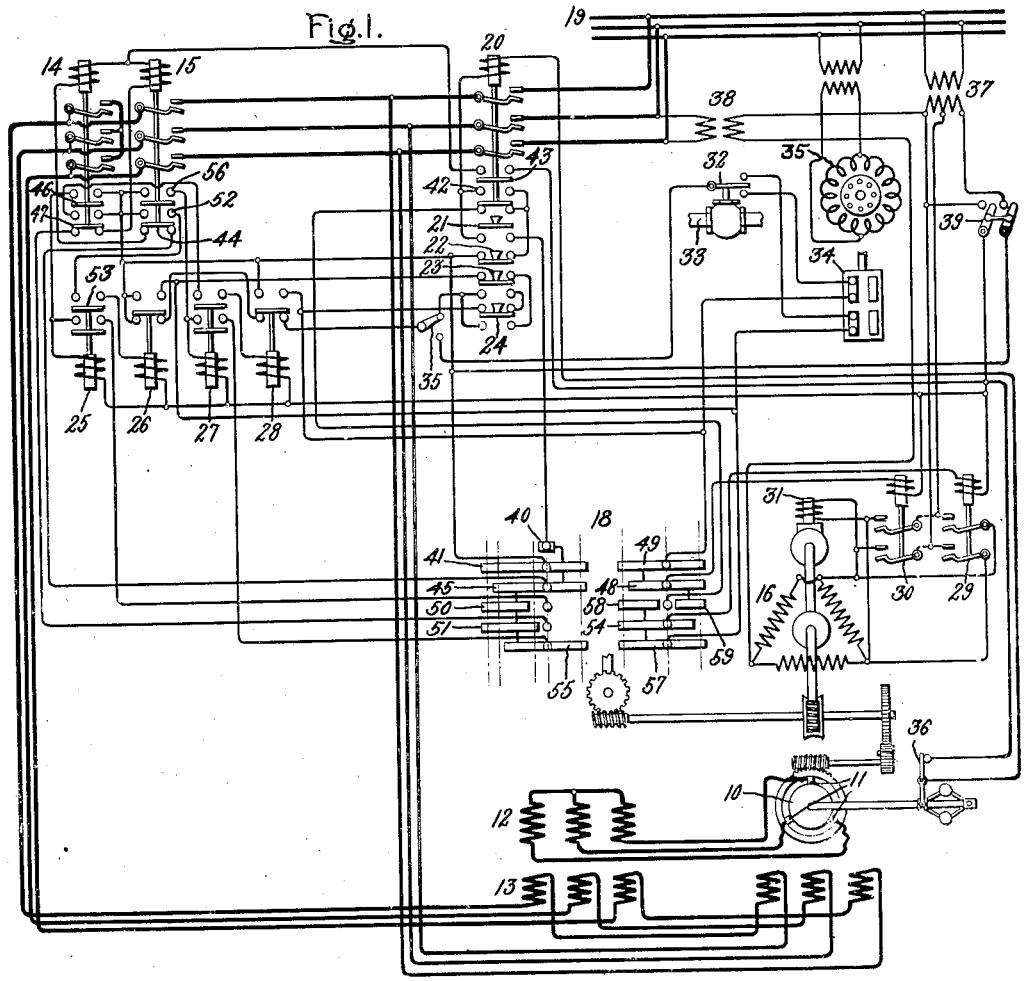

Aug. 19, 1924. 1,505,929
A. C. PRESCOTT
MOTOR CONTROL
Filed March 25, 1922

Inventor
Arthur C. Prescott,
by Albert E. Davis
His Attorney

Patented Aug. 19, 1924.

1,505,929

UNITED STATES PATENT OFFICE.

ARTHUR C. PRESCOTT, OF SCHENECTADY, NEW YORK, ASSIGNOR TO GENERAL ELECTRIC COMPANY, A CORPORATION OF NEW YORK.

MOTOR CONTROL.

Application filed March 25, 1922. Serial No. 546,766.

*To all whom it may concern:*

Be it known that I, ARTHUR C. PRESCOTT, a citizen of the United States, residing at Schenectady, in the county of Schenectady, State of New York, have invented certain new and useful Improvements in Motor Control, of which the following is a specification.

My invention relates to the control of an electric motor of the commutator type.

One of the objects of the invention is to provide an arrangement whereby the speed of the motor may be changed by shifting the motor brushes on the commutator, the control being such that the motor brushes must be in a predetermined position before the motor is connected to a source of supply, thereby preventing bad commutation and insuring that the motor will have a proper starting torque.

It would be desirable to obtain the entire range of speed changes by shifting the motor brushes but that may produce an inefficient operation of the motor so that in order to obtain a good efficiency it is desirable to change the relation of the motor windings from a low to a high speed relation and vice versa. However, to thus change the motor windings would produce a very great change of speed so that a further object of the invention is to provide an arrangement in which the speed of the motor is changed by changing the connections of the motor windings from a low to a high speed relation, and vice versa, and to compensate for the comparatively large change in the motor speed thus attempted to be effected by automatically shifting the motor brushes in the proper direction so that the change in the motor speed from one speed relation of the motor windings to the other is effected in a smooth and gradual manner.

Another object of the invention is the provision of an arrangement whereby the motor brushes are shifted and the change in the relation of the motor windings is automatically effected in response to a predetermined condition which is subject to variation.

A further object is the provision of an arrangement whereby the motor brushes are shifted and the relation of the motor windings is changed under the control of manually operated master switch mechanism, the arrangement to be such that an operator may cause an increase or decrease of the motor speed at will, the motor brushes being shifted automatically independently of the manual operation when the relation of the motor windings is changed so as to compensate for the comparatively large change in speed thereby attempted to be effected.

These and other objects of the invention, which are either pointed out in detail hereinafter or as will be apparent to those skilled in the art, are attained by the motor control system and apparatus shown very diagrammatically on the accompanying drawing which illustrates an embodiment of the invention for the purpose of explaining the principles thereof.

Figure 2:
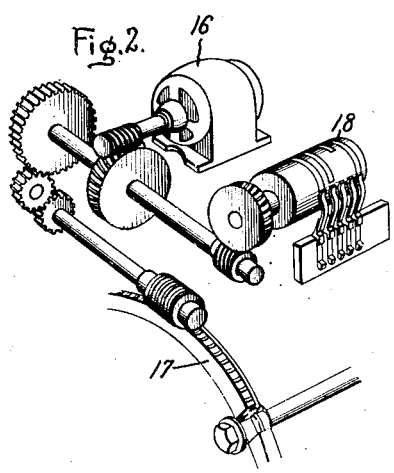

Referring to the drawing, Fig. 1 is a system of control in accordance with the invention, and Fig. 2 is a detail showing the arrangement for shifting the motor brushes and for synchronously operating a controller which controls the main driving motor and the pilot motor which operates the brush shifting mechanism.

The electric motor 10 is of the alternating current commutator type having brushes 11 which are arranged so that they may be shifted to vary the motor speed. This motor is provided with a set of secondary windings 12 which are connected to the motor brushes and a set of primary windings 13 which are arranged to be connected in either a low or a high speed relation. The electromagnetic switch 14 is provided for connecting the motor primary windings in Y relation for low speed operation and the electromagnetic switch 15 is provided for connecting the motor primary windings in delta for high speed operation. The motor brushes are arranged to be shifted by means of the pilot motor 16 which is connected to the brush rigging 17 of the motor 10 by means of the worm and spur gear speed reduction shown in Fig. 2. The pilot motor 16 operates the drum controller 18 synchronously with the shifting of the brushes, and to that end the controller 18 is mechanically connected to the pilot motor 16 by the worm gear drive shown in Fig. 2 and shown diagrammatically in Fig. 1.

The main driving motor 10 is connected to the source of supply 19 by means of the electromagnetic line switch 20. Manually operated switch mechanism comprising the start push button 21, the stop push button 22, the fast push button 23 and the slow push button 24, comprises means whereby the shifting of the motor brushes and the change in the motor primary windings from Y to delta and vice versa may be manually controlled by an operator. The relays 25, 26, 27 and 28 are provided for rendering the control of the shifting of the motor brushes independent of the fast and slow push buttons when the relation of the motor primary windings are changed from Y to delta, and vice versa. This is to insure that the motor brushes are automatically shifted so as to compensate for the comparatively large change of speed attempted to be effected by changing the motor primary windings so that the actual change in motor speed from one speed relation of the motor windings to the other is effected in a smooth and gradual manner.

The pilot motor 16 is operated in either the forward or reverse direction, depending upon which one of the switches 29 or 30 is closed. The electromagnetic switch 29 is provided for connecting the motor to the source of supply 19 so as to operate the motor brushes to decrease the speed of driving the motor, and the electromagnetic switch 30 is provided for connecting the pilot motor to the source of supply so as to operate the motor brushes to increase the speed of the driving motor 10. The solenoid brake 31 is provided for stopping the pilot motor 16 when the pilot motor is disconnected from the source of supply.

The automatically operated switch 32 is provided for automatically controlling the speed of the main driving motor 10 in accordance with a predetermined condition which is subject to variation. Thus, for example, this switch may be operated in response to the pressure of the fluid in a conduit 33. This is merely to indicate one of predetermined controlling conditions for which automatic speed control of the main driving motor 10 may be provided to regulate. In order to insure that too large a change in speed will not be effected automatically, the continuously rotating drum controller 34 is provided for intermittently interrupting and then completing the circuit through the automatically operated switch 32. This gives an intermittent operation so the shifting of the motor brushes and the various speed changes of the main motor 10 may not be too quickly accomplished. This drum controller 34 may be continuously operated in any suitable manner and at any suitable speed, and for that purpose I have indicated diagrammatically the alternating current motor 35 which is connected to the supply circuit 19.

The arrangement, in general, is such that before the electromagnetic line switch 20 may be closed in order to start the equipment, the pilot motor operated drum controller 18 must be in the starting position and the brushes of the main driving motor in a predetermined position which experience dictates as the proper position of the motor brushes which will give a good starting torque for the motor and permit good commutation. When the start push button 21 is closed, with the controller 18 and the motor brushes in their proper respective positions, the electromagnetic line switch 20 will be closed. The Y connection switch 14 is then automatically energized to close so that the motor is connected to the source of supply 19 for a certain speed of operation which has been selected as the proper starting speed. The line contactor 20 makes a holding circuit for its winding when it closes so that the start push button 21 may be released and the equipment will continue to operate at the selected starting speed. If it is now desired to increase the driving motor speed, the fast push button 23 will be closed, thereby energizing the contactor 30 which will close and connect the pilot motor 16 to the supply circuit for operation in such a direction that the brushes of the main motor 10 will be shifted so as to increase the speed of the main motor. As diagrammatically shown in Fig. 1, the pilot motor operated controller 18 will be synchronously moved from the left towards the right. In a certain position of the controller 18 which corresponds to a certain speed of the motor, the Y switch 14 is automatically deenergized and the delta switch 15 is energized to close (assuming that the fast push button 23 has been maintained closed). If the motor brushes were not now shifted to reduce the speed of the motor when this change in the motor primary windings is effected, the change in speed accomplished would be entirely too sudden for the customary conditions imposed. In order to insure that the motor brushes will be shifted to reduce the motor speed so as to compensate for the comparatively large change in speed attempted to be effected by changing from the Y to the delta connection of the primary windings of the motor, the relays 25, 26 and 27 function to temporarily take away control from the fast push button 23 and cause the pilot motor direction contactor 30 to be opened and the direction contactor 29 for the pilot motor to be closed, thereby reversing the direction of operation of the pilot motor and returning the motor brushes 11 to the proper position. The pilot motor operated controller 18 will be returned synchronously with the backward shift of the motor brushes, so that the relays 25, 26 and 27 will be controlled in such a manner that the control of the motor speed is restored to the operator. In other words, the control is automatically restored to the fast push button 23. The pilot motor direction contactor 29 will be deenergized and the pilot motor direction contactor 30 will be energized to cause the pilot motor to shift the motor brushes to increase the motor speed. The shifting of the motor brushes to increase the motor speed will proceed until the maximum speed position is reached, whereupon the contactor 30 will be deenergized, the pilot motor 16 stopped and the pilot motor operated controller 18 also stopped.

If it is desired that the speed of the driving motor 10 be decreased, the slow push button 24 will be depressed thereby energizing the pilot motor contactor 29 to cause this pilot motor to shift the motor brushes backward to decrease the motor speed. If this push button is maintained depressed, the delta connection contactor 15 will be deenergized and the Y connection contactor 14 automatically energized to close. A comparatively large change of speed of the main driving motor 10 is thereby attempted to be effected, and in order to compensate for this large change of speed, the pilot motor contactor 29 is deenergized, the contactor 30 is energized, and the direction of operation of the pilot motor is thereby reversed to shift the brushes to increase the motor speed. The relays 26, 27 and 28 now function to temporarily take control from the slow push button 24, so that the compensation for the change of speed for the main driving motor is temporarily effected irrespective of the wishes of the operator. When the speed of the main driving motor 10 has been thus properly adjusted, the pilot motor contactor 30 is deenergized and the contactor 29 is energized, thereby shifting the motor brushes so as to further decrease the motor speed.

In case it is desired after the equipment has been started that the automatically operated switch 32 shall control the speed of the driving motor, the pilot switch 60 will be thrown to its lower position, thereby cutting out the control by the fast and slow push buttons 23 and 24 and giving the control of the equipment to the automatically operated switch 32.
The speed limit switch 36 is provided for automatically disconnecting the driving motor from the source of supply 19 by deenergizing the line contactor 20 in case the speed of the main driving motor becomes too high.

With this general understanding of the operation of the arrangement, the operation in detail will now be described: The control power for operating the various electromagnetic switches is supplied through the voltage reducing transformer 37, and the pilot motor 16 is supplied through the transformer 37 and the transformer 38. The disconnecting switch 39 will first be closed, and with the parts in their respective positions shown in the drawing, the driving motor 10 will not be started until the starting push button 21 is depressed. The electromagnetic line switch 20 is thereupon energized to close through a circuit which includes the left hand blade of the disconnecting switch 39, the speed limit switch 36, winding of contactor 20, start push button 21, segment 40 of drum controller 18, and segment 41 of this controller to the right hand blade of the disconnecting switch 39. When the line switch 20 closes, it establishes a maintaining circuit for its winding through the auxiliary contacts 42 and the stop push button 22, so that when the circuit through the segment 40 of the drum controller 18 is broken, the line switch 20 will be maintained closed. The start push button 21 may now be released. When the line contactor 20 closes, the Y connection contactor 14 is automatically energized to close by the closing of the auxiliary switch 43 of the line contactor 20. The circuit for the winding of the Y contactor 14 may be traced as follows: from the left hand blade of the disconnecting switch 39, through the auxiliary switch 43, winding of contactor 14, auxiliary switch 44 of the delta connection contactor 15, segments 45 and 41 of drum controller 18, to the right hand blade of the disconnecting switch 39. When the Y connection contactor 14 closes, it automatically energizes the relay 25 to close through a circuit including the auxiliary switch 46. The circuit for the winding of the contactor 15 is maintained open at the auxiliary switch 47. The auxiliary switch 44 is provided for insuring that the Y connection contactor 14 cannot be energized to close unless the delta connection contactor 15 is in the open position, and the auxiliary switch 47 is provided for insuring that the delta connection contactor 15 cannot be energized to close unless the Y connection contactor 14 is open.

The driving motor 10 will thus be energized to operate at a predetermined intermediate speed, and in case it is desired that the speed of the driving motor be increased, the fast push button 23 will be depressed, thereby energizing the winding of the direction contactor 30 for the pilot motor through a circuit including the left hand blade of the disconnecting switch 39, the winding of contactor 30, segments 48 and 49 of the drum controller 18, slow push button 24, fast push button 23, pilot switch 60, lower contacts of relay 28, lower contacts of relay 26, to the right hand blade of the disconnecting switch 39. The pilot motor 16 will thereby be energized to shift the motor brushes 11 to increase the speed of the main driving motor, and the drum controller 18 will be operated synchronously with the movement of the motor brushes. The controller 18 is shown in its developed form in Fig. 1 and as shown in this figure the controller is operated from left to right when the motor brushes are shifted to increase the motor speed, and vice versa when the motor brushes are shifted to decrease the motor speed. The drum controller 18 is operated toward the right to complete a circuit through the segment 50 and the winding of the relay 25 will be maintained energized independently of the control by the Y connection contactor 14. Therefore, when the circuit through the segment 45 of this controller is opened and the Y connection contactor 14 thereby deenergized, the relay 25 will nevertheless be maintained closed.

When the contactor 14 opens, the contactor 15 is automatically energized to close through a circuit including the auxiliary switch 47 of the contactor 14 and the segment 51 of the drum controller 18. The relay 26 is energized to close through a circuit including the middle auxiliary contacts 52 of the contactor 15 and the upper contact member 53 of the relay 25. When the relay 26 is energized to close, it opens the circuit through the fast push button 23 at its lower contacts, and thus deenergizes the direction contactor 30 for the pilot motor. The opposite direction contactor 29 for the pilot motor is then automatically energized through a circuit which includes the left hand blade of the disconnecting switch 39, the winding of contactor 29, segments 54 and 57 of the controller 18, upper contacts of relay 26, to the right hand blade of the disconnecting switch 39. The brushes of the main motor 10 are thereby shifted by the pilot motor to decrease the speed of the main motor, and the controller 18 is moved from right toward the left.

When the segment 55 of the drum controller is returned into engagement with its stationary contact, the winding of the relay 27 is provided with a maintaining circuit so that this relay will be maintained closed after having been energized to close through the upper contacts 56 of the delta contactor 15. When the controller 18 has been moved toward the right to such a position that the segment 50 thereof breaks engagement with its stationary contact, the maintaining circuit for the relay 25 is broken, and this relay will therefore open and deenergize the relay 26. The relay 26 in opening opens the circuit for the direction contactor 29 of the pilot motor and restores the control to the fast push button 23 at the lower contacts of the relay 26. The direction contactor 30 of the pilot motor will thereby be energized to close and cause the pilot motor to operate to shift the brushes of the main motor to increase the main motor speed. The maintaining circuit for the relay 27 will be broken at the segment 55 at the controller 18 when the brushes have been shifted to a certain position, and the winding of the contactor 30 will be opened at the segment 48 to prevent further shifting the motor brushes. This will determine the maximum speed of the motor.

With the equipment operating at the highest speed, let it be assumed that it is desired that the speed of the main driving motor be decreased. The slow push button 24 will be depressed, thereby energizing the direction contactor 29 through a circuit through the left hand blade of the disconnecting switch 39, winding of contactor 29, segment 54 of the controller 18, segment 57 of this controller, fast push button 23, slow push button 24, lower contacts of relays 28 and 26, to the right hand blade of the disconnecting switch 39. The pilot motor will thereupon operate to shift the main motor brushes to decrease the main motor speed. When the brushes have been shifted to such a position that the circuit through the segment 51 to the controller 18 is opened, the delta connection contactor 15 is automatically deenergized and opened. The Y connection contactor 14 is automatically energized to close through the segment 45 of the controller 18. It will be remembered that with the delta connection contactor 15 closed, the relay 27 is energized to close, and that the winding of this relay is provided with a maintaining circuit through the segment 55 of the controller 18, so that in case this segment is in engagement with its stationary contact after the contactor 15 opens, the relay 27 will nevertheless be maintained closed. When the contactor 14 closes, the relay 28 is energized to close through the upper contacts of the relay 27 and the auxiliary switch 46 of the contactor 14. When the relay 28 operates, it opens the circuit through its lower contacts, thereby taking away the control by the slow push button 24 and opening the circuit for the winding of the direction contactor 29 for the pilot motor. The direction contactor 30 of the pilot motor will be automatically energized to close through the upper contacts of the relay 28. When the brushes of the main motor 10 are thus shifted so as to increase the motor speed, and when the maintaining circuit for the relay 27 is broken at the segment 55 of the controller 18, this relay will open, thereby deenergizing the relay 28 and restoring the control to the slow push button 24.

It will be observed that the speed of the driving motor 10 may be increased or decreased at will within the predetermined limits by the operation of the fast and slow push buttons 23 and 24. In other words, the speed of the main motor 10 is determined by the operation of these push buttons, so that the speed of the driving motor may be exactly determined by the operator. In case, however, it is desired that the speed of the main motor shall be automatically controlled in response to a predetermined condition, such for example as the pressure in the conduit 33, the pilot switch 60 will be thrown to make engagement with its lower contact. When this happens, the speed of the main motor will be either automatically increased or decreased in a step by step manner without any attention by the operator.

In case the voltage of the supply circuit should fail, and the various switches thus automatically opened, the brushes of the main motor 10 must be shifted to the predetermined safe starting position before the line switch 20 may be closed. In other words, the controller 18 must be returned to the position shown in the drawing at which the circuit for the winding of the line contactor 20 may be completed through the segment 40 of this controller. It will also be observed that the segments 58 and 59 of the controller 18 provide means whereby the pilot motor is controlled in such a manner that it is required to return the brushes and the controller 18 to their respective positions shown in the drawing when the power is resumed after a failure thereof.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:—

1. A system of motor control comprising an electric motor of the commutator type having brushes which are adapted to be shifted to vary the motor speed and windings which are adapted to be connected in one relation for low speed operation and in a second relation for high speed operation, means for shifting the said brushes, switch mechanism for connecting the motor windings in either the low or the high speed relation, and connections whereby the said means is automatically operated to shift the motor brushes to compensate for the comparatively large change of speed effected by the change of the motor windings from one of said relations to the other.

2. A system of control for an alternating current motor of the commutator type having brushes which are adapted to be shifted to vary the speed and primary windings adapted to be Y or delta connected, of means for shifting the said brushes, switch mechanism for establishing either the Y or the delta connection of the primary windings of the motor, and connections whereby the said means is automatically operated to shift the motor brushes to decrease the motor speed when the motor primary windings are changed from Y to delta and to shift the said brushes to increase the motor speed when the motor primary windings are changed from delta to Y.

3. A system of motor control comprising an electric motor of the commutator type having brushes which are adapted to be shifted to vary the motor speed and windings which are adapted to be connected in one relation for low speed operation and in a second relation for high speed operation, means for shifting the said brushes, electroresponsive switch mechanism for connecting the motor windings in either of said relations, manually operated master switch mechanism for controlling the said electroresponsive switch mechanism, and connections whereby the said means is automatically operated to shift the motor brushes independently of the control by the said master switch mechanism to compensate for the comparatively large change of speed effected by the change of the motor windings from one of said relations to the other.

4. A system of control for an alternating current motor of the commutator type having brushes which are adapted to be shifted to vary the speed and primary windings adapted to be Y or delta connected, of a pilot motor for shifting the said brushes, a controller operated by the said pilot motor, electroresponsive switch mechanism under the control of said controller for establishing either the Y or delta connections of the primary windings of the motor, manually operated master switch mechanism for controlling the said pilot motor and the said electroresponsive switch mechanism, relays under the control of the said electroresponsive switch mechanism for controlling the said pilot motor, and connections whereby the said pilot motor is controlled by the said relays to automatically shift the motor brushes independently of the said master switch mechanism to compensate for the comparatively large change of speed effected by the change in the connection of the motor windings.

5. A system of motor control comprising a commutator type electric motor having brushes which are adapted to be shifted to vary the motor speed, means for shifting the said brushes, switch mechanism for connecting the motor to a source of supply, and connections between the said means and the said switch mechanism whereby the operation of the said switch mechanism is prevented unless the said brushes are in a predetermined position.

6. A system of motor control comprising a commutator type electric driving motor having brushes which are adapted to be shifted to vary the motor speed, a pilot motor for shifting the brushes to vary the speed of the driving motor, means automatically operated in response to predetermined conditions for controlling the said pilot motor, an electromagnetic switch for controlling the connection of the driving motor to a source of supply, and connections whereby the said switch is prevented from being closed unless the brushes of the driving motor are in a predetermined position.

In witness whereof, I have hereunto set my hand this 24th day of March, 1922.

ARTHUR C. PRESCOTT.